United States Patent [19]

Ogino

[11] Patent Number: 5,448,542
[45] Date of Patent: Sep. 5, 1995

[54] OPTICAL INFORMATION RECORDING AND REPRODUCING APPARATUS INCLUDING A COMPUTING UNIT FOR CALCULATING TRACKING AND FOCUSING ERROR CORRECTION VALUES

[75] Inventor: Tsukasa Ogino, Yokohama, Japan

[73] Assignee: Canon Kabushiki Kaisha, Tokyo, Japan

[21] Appl. No.: 118,687

[22] Filed: Sep. 10, 1993

Related U.S. Application Data

[63] Continuation of Ser. No. 498,434, Mar. 26, 1990, abandoned.

[30] Foreign Application Priority Data

Mar. 28, 1989 [JP] Japan .................................. 1-73999
Mar. 16, 1990 [JP] Japan .................................. 2-64306

[51] Int. Cl.⁶ .................................................. G11B 7/09
[52] U.S. Cl. .............................. 369/44.29; 369/44.34; 369/44.35
[58] Field of Search ............... 369/44.25, 44.27, 44.29, 369/44.32, 54, 32, 44.34, 44.35

[56] References Cited

U.S. PATENT DOCUMENTS

| | | | |
|---|---|---|---|
| 4,795,958 | 1/1989 | Nakamura et al. | 369/44.34 |
| 4,907,214 | 3/1990 | Nagano et al. | 369/32 |
| 4,918,676 | 4/1990 | Miyasaka | 369/32 |
| 4,982,297 | 1/1991 | Tsujisawa | 369/44.34 |
| 5,023,857 | 6/1991 | Verboom | 369/44.25 |
| 5,050,149 | 9/1991 | Ishii et al. | 369/43 |
| 5,161,141 | 11/1992 | Sawata | 369/44.32 |
| 5,235,577 | 8/1993 | Ogino | 369/44.28 |

FOREIGN PATENT DOCUMENTS

| | | |
|---|---|---|
| 0249462 | 12/1987 | European Pat. Off. |
| 0261916 | 3/1988 | European Pat. Off. |
| 62-298931 | 12/1987 | Japan ................................. 369/44.34 |

OTHER PUBLICATIONS

Hederer, et al., "Programmed Measurement for Selection of Data Measured," Messen & Prüfen/Automatik 72, vol. 180, No. 4, Apr. 1976, pp. 180, 182 through 186, 200.

Primary Examiner—Tommy P. Chin
Assistant Examiner—Khoi Truong
Attorney, Agent, or Firm—Fitzpatrick, Cella, Harper & Scinto

[57] ABSTRACT

An optical information recording and reproducing apparatus for effecting at least one of recording of information on and reproducing of information from a recording medium. The apparatus includes an optical system for applying a light beam to a desired track on the recording medium, a tracking and focusing error detection device for detecting tracking and/or focusing error of the light beam relative to the track, a computing unit for (i) receiving respective tracking error and focusing error output signals from the detecting device, (ii) effecting a computation for a selected output signal among the received output signals on the basis of a predetermined program to correct the detected tracking error and focusing error, (iii) calculating tracking and focusing control movement amounts and (iv) outputting a tracking control signal and a focusing control signal corresponding to the tracking control movement amount and the focusing control movement amount, respectively. The apparatus also includes a tracking actuator for moving at least a portion of the optical system to move the light beam relative to the track on the basis of the tracking control signal, and a focusing actuator for moving a portion of the optical system relative to the recording medium to adjust a focusing state of the light beam on the basis of the focusing control signal.

8 Claims, 5 Drawing Sheets

OPTICAL INFORMATION RECORDING AND REPRODUCING APPARATUS INCLUDING A COMPUTING UNIT FOR CALCULATING TRACKING AND FOCUSING ERROR CORRECTION VALUES

This application is a continuation of prior application, Ser. No. 07/498,434 filed Mar. 26, 1990 (now abandoned).

BACKGROUND OF THE INVENTION

1. Field of the Invention

The present invention relates to a digital position control apparatus for controlling the position of an object to be controlled by digital information and, more particularly, to a digital servo control apparatus suitable for use in the position control of an optical head in a recording/reproducing apparatus of an optical disc or the like.

2. Related Background Art

In an optical disc, tracks are concentrically or spirally formed on the disc and are separated into a plurality of sectors in order to record variable length data or to make the accessing speed high and the optical recording/reproducing operation is executed on a sector unit basis.

To access an optical head to each sector and track, it is necessary to execute the position control (hereinafter, simply referred to as servo control) in what are called focusing and tracking directions of the optical head (mainly, the optical system). Such a servo control is largely classified into an analog servo control and a digital servo control in dependence on the difference of a signal form to be handled.

In recent years, the digital servo control is highlighted because of an advantage such that the setting of parameters can be changed from the outside.

Figure 6:
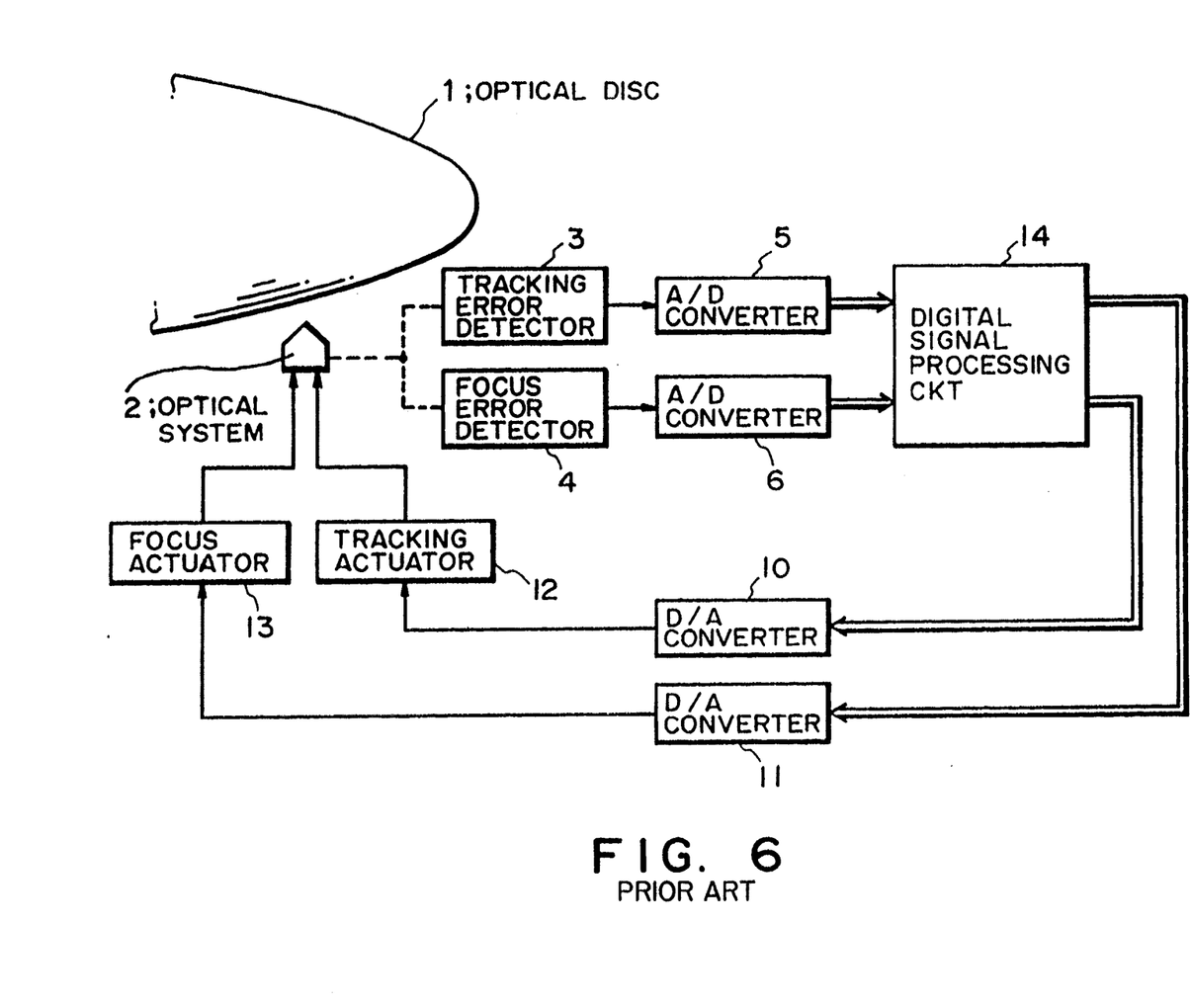
FIG. 6 is a schematic diagram showing a conventional digital servo control apparatus.

FIG. 6 shows an example of a digital servo control apparatus which is used in a conventional optical disc recording/reproducing apparatus.

In the diagram, reference numeral 1 denotes an optical disc as a recording medium; 2 an optical system of an optical head; 3 a tracking error detector to detect a tracking error signal on the basis of an output from the optical system 2; and 4 a focus error detector to detect a focus error signal on the basis of the output from the optical system 2. A well-known detecting method in the optical disc recording apparatus or the like can be used for the tracking error detector 3 and focus error detector 4. For instance, a push-pull method is used to detect a tracking error and an astigmatism method is used to detect focus error, or the like. Explanation will be continued.

Reference numerals 5 and 6 denote A/D converters for A/D converting error signals which were output from the error detectors 3 and 4 into digital signals; 14 indicates a digital signal processing circuit (DSP); 10 and 11 D/A converters for converting the digital signals from the DSP 14 into the analog signals; 12 and 13 a tracking actuator and a focus actuator each for driving the optical system 2 of the optical head in a predetermined direction.

The operation of the optical disc servo control apparatus with the above construction will now be described.

First, when information is recorded or reproduced onto/from the optical disc 1 by the optical system 2, the position of the optical system 2 is controlled (hereinafter, simply referred to as a servo control) by the focus actuator 13 and tracking actuator 12. A tracking error signal and a focus error signal are detected from the reflected lights from the optical disc 1. The detected error signals are computed and processed by predetermined calculating equations by the digital signal processing circuit, thereby obtaining controlled variables. The actuators 12 and 13 are made operative on the basis of the controlled valuables. Information is recorded or reproduced to/from a desired track or sector by the above operations while executing the tracking and focusing operations.

However, in the above conventional example, each time the analog servo error signals are converted into the digital signals by the A/D converters 5 and 6, the controlled variables to the actuators are calculated by the DSP 14. Thus, there is a problem such that it always takes a predetermined time and the processing time corresponding to the computing processes is always included in the servo control system.

SUMMARY OF THE INVENTION

The present invention is made in consideration of the above problems and it is an object of the invention to provide a digital servo control apparatus which can reduce the processing time corresponding to the computing time as much as possible and which can execute sufficient servo control.

The above object is accomplished by a method whereby controlled variables to actuators are not calculated by a digital signal processing circuit with respect to a signal in a predetermined state in which a tracking error signal and/or a focus error signal are detected.

The above method will be explained in detail in embodiments, which will be explained later.

DETAILED DESCRIPTION OF THE PREFERRED EMBODIMENTS

The present invention will be described hereinbelow with reference to the FIGS. 1 through 5 of the drawings. Reference numeral 101 denotes an optical disc as a recording medium; 102 indicates an optical system including an objective lens for converging a laser beam emitted from a laser source (not shown) like a spot onto the optical disc and irradiating the laser beam spot onto the optical disc in order to record and/or reproduce information onto/from the optical disc; 103 a tracking error detector for detecting a relative position error signal (tracking error signal) in the tracking direction of the objective lens and the optical disc by a well-known method on the basis of the reflected lights which are obtained when the laser beam is irradiated onto the optical disc; 104 a focus error detector for detecting a relative position error signal (focus error signal) in the focusing direction of the objective lens and the optical disc by a well-known method on the basis of the reflected lights which are obtained when the laser beam is irradiated onto the optical disc; 105 an A/D converter to convert an analog output of the tracking error detector 103 into a digital signal; 106 an A/D converter to convert an analog output of the focus error detector 104 into a digital signal; 107 a comparator to compare the outputs of the A/D converters 105 and 106 with a predetermined value which has previously been set; and 108 a computing element to calculate outputs of the comparator 107 in accordance with predetermined calculating equations. The computing element denotes a computing element in which the DSP or computing circuit to execute the calculations in accordance with the written programs is constructed in a hardware manner. On the other hand, in the computing element, various parameters can be changed by a control signal which is sent from the upper control unit (not shown). Reference numeral 110 denotes a D/A converter to convert a digital output of the computing element or comparator corresponding to the tracking error signal into an analog signal; 111 a D/A converter to convert a digital output of the computing element or comparator corresponding to the focus error signal into an analog signal; 112 a tracking actuator to drive the objective lens in the tracking direction on the basis of the output of the D/A converter 110; and 113 a focus actuator to drive the objective lens in the focusing direction on the basis of the output of the D/A converter 111.

Figure 1:
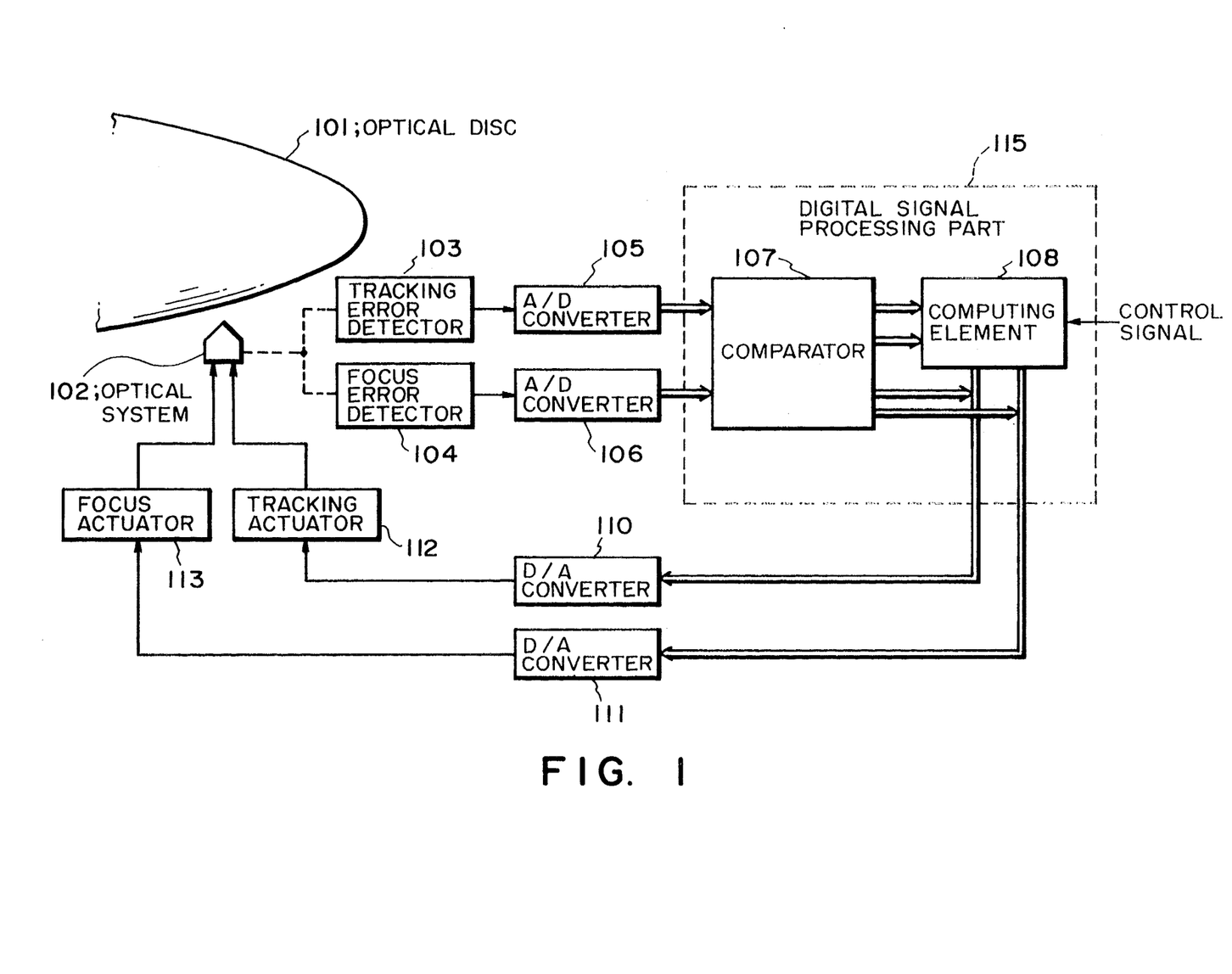
FIG. 1 is a schematic diagram showing the first embodiment of a digital servo control apparatus of the present invention.

The operation in the above construction will now be described.

Figure 2:
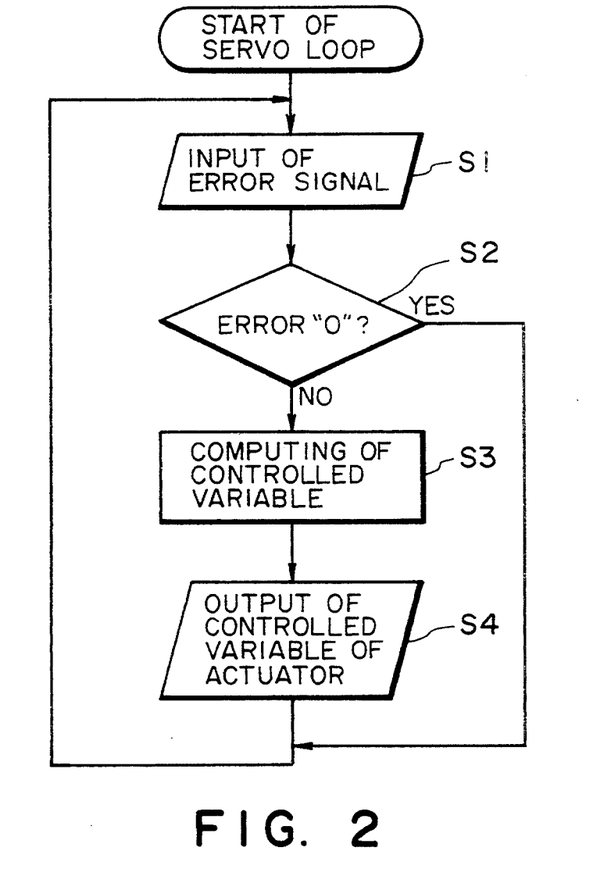
FIG. 2 is a flowchart showing the operation of the first embodiment of the invention.

FIG. 2 is a diagram showing a flow of the operation. In the recording or reproducing mode, the reflected lights from the optical disc 101 enter the optical system 2 and the tracking error signal is detected by the tracking error detector 103. The focus error signal is similarly detected by the focus error detector 104. The tracking error signal and focus error signal are converted into the digital signals by the A/D converters 105 and 106, respectively, and are input to the comparator 107 in a digital signal processing part 115 (step S1 in FIG. 2). In the comparator 107, a check is made to see if the tracking error signal and/or focus error signal is set to "0" or not (step S2). If it is set to "0", the tracking error signal and/or focus error signal is not input to the computing element 108 but is input to the D/A converter 110 or 111, respectively. In this case, the controlled variables to the actuators are not changed but the objective lens is maintained in the same state.

If NO in step S2, the comparator 107 inputs the tracking error signal and/or focus error signal to the computing element 108. In the computing element 108, the controlled variables of the tracking actuator 112 or focus actuator 113 are calculated from the input signal on the basis of predetermined calculating equations (step S3). The results of the calculations are output to the D/A converter 110 or 111 (step S4).

The controlled variables which were converted into the analog values by the D/A converter 110 and 111 are input to the tracking actuator 112 and focus actuator 113, respectively. The tracking actuator 112 and focus actuator 113 drive the objective lens in the tracking and focusing directions in accordance with the controlled variables, respectively. That is, the tracking servo and focus servo are executed.

Figure 3:
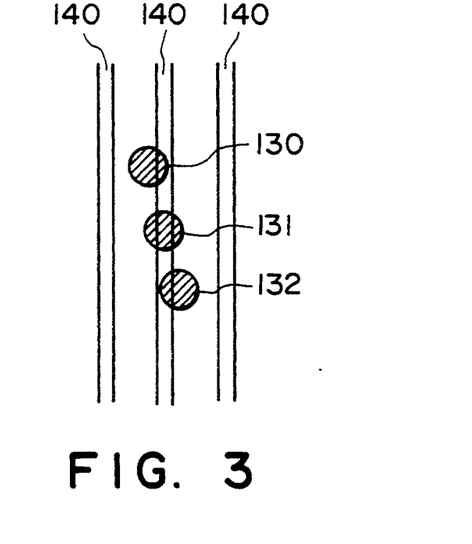
FIG. 3 is a diagram showing an arrangement of tracks and beam spots on an optical disc.

FIG. 3 is a diagram showing an arrangement of beam spots 130, 131, and 132 on the recording medium from tracks 140 and the optical head. When the tracking error signal is set to "0", the tracking of the beam spot 131 is correctly executed and there is no need to control by executing complicated calculations. The above circumstances are also the same as the case of the focus control of the in-focus state.

The second embodiment of the invention will now be described in detail with reference to the drawings.

Figure 4:
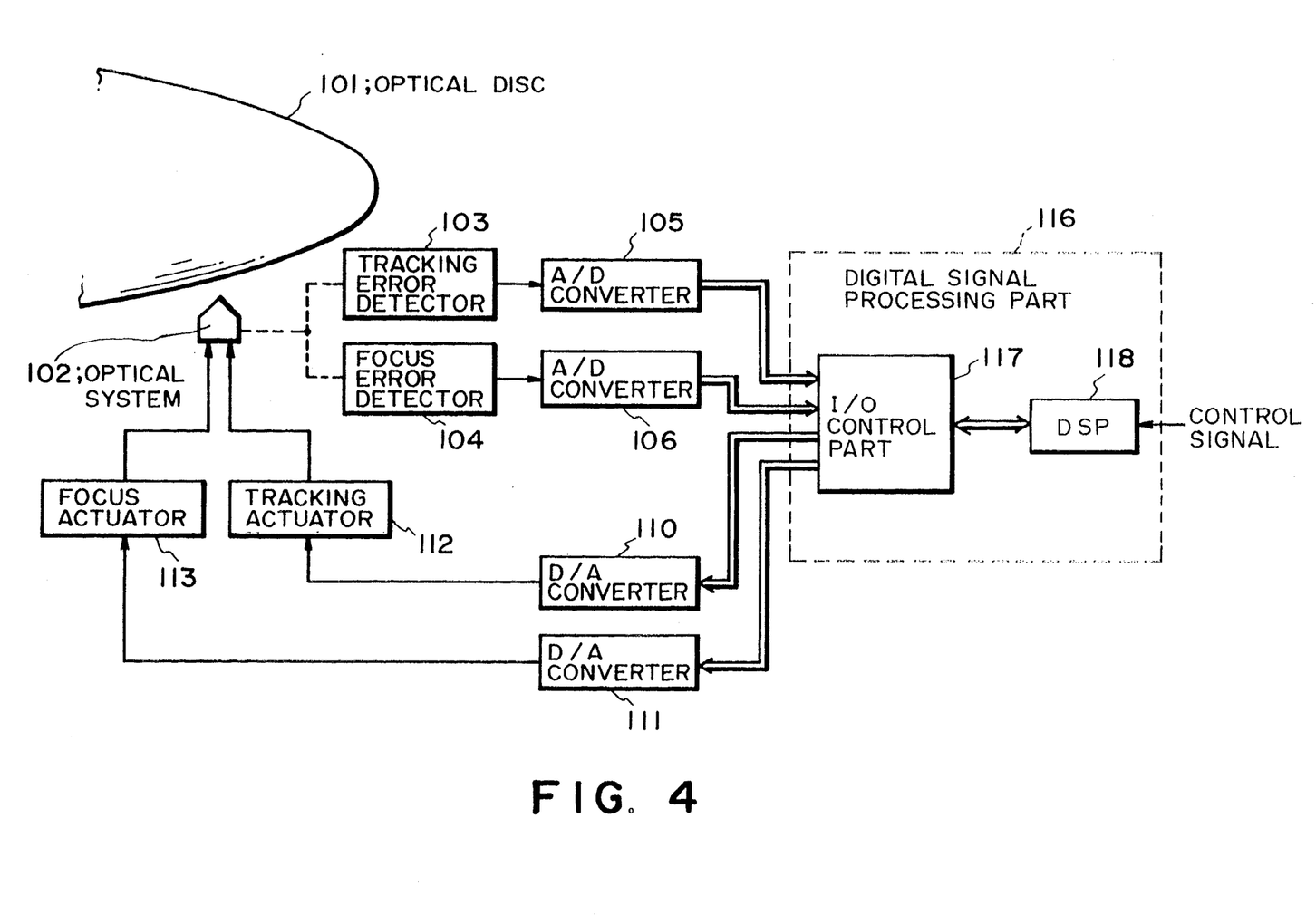
FIG. 4 is a schematic diagram showing the second embodiment of a digital servo control apparatus of the invention.

FIG. 4 is a schematic diagram showing an example of a construction of an optical disc recording/reproducing apparatus in which the digital servo control apparatus of the invention is installed.

In FIG. 4, the same parts and components as those shown in FIG. 1 are designated by the same reference numerals. Reference numeral 117 denotes an I/O (input/output) control part and 118 indicates a digital signal processor (hereinafter, abbreviated as DSP).

The DSP 118 executes discriminating and calculating processes in accordance with programs which have previously been written. In the DSP, various parameters (filter constant and the like) are changed in accordance with control signals which are sent from an upper control unit (not shown).

Figure 5:
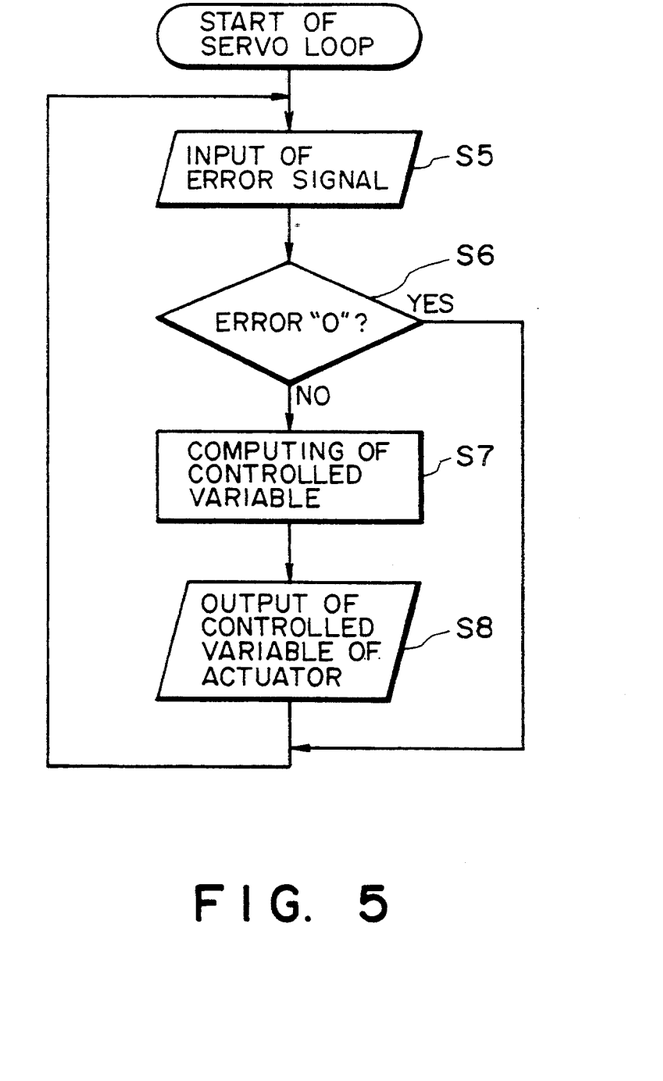
FIG. 5 is a flowchart showing the operation of the second embodiment of the invention.

The operation of the digital servo control apparatus of the optical disc which has been constructed as mentioned above will now be described with reference to FIG. 5.

The reflected lights from the optical disc 101 are input to the optical system 102 and a tracking error signal is detected by the tracking error detector 103.

Similarly, a focus error signal is detected by the focus error detector 104. The tracking error signal and the focus error signal are converted into the digital signals by the A/D converters 105 and 106, respectively, and are input to the DSP 118 through the I/O control part 117 (step S5). In the DSP 118, a check is made to see if the input servo error signal is set to "0" or not (step S6) (the discrimination in this step is executed in accordance with the program which has previously been written in the DSP 118). If it is "0", the operation to obtain the controlled variables which are necessary to accurately control the optical system 2 to a desired position by predetermined calculating equations is not executed but the controlled variables to the actuators are maintained in their existing states. Thus, the DSP 118 can assign the time when no calculating process is executed to the processes of other control loops (not shown) or to other processes (not shown) in the DSP 118. The control system can be simplified. If the servo error signal is not set to "0", in the DSP 118, the calculations are executed in accordance with the programs and the controlled variables are obtained (step S7) and are output to the D/A converters 110 and 111 through the I/O control part 117 (step S8).

The calculations by the DSP 118 are executed by inputting the servo error signal which was sampled by a predetermined clock period.

The controlled variables which were converted into the analog values by the D/A converters 110 and 111 are input to the tracking actuator 112 or focus actuator 113. The tracking actuator 112 and focus actuator 113 drive the objective lens in the tracking and focusing directions in accordance with the controlled variables, respectively. That is, the tracking servo and focus servo are performed.

The present invention is not limited to the above embodiments but various other embodiments are possible.

For instance, it is also possible to construct such a device in a manner such that in addition to the focus actuator 113 and tracking actuator 112, actuators are provided for other objects to be controlled, and the DSP 118 executes many calculating processes and can output the controlled variables to each of the actuators. In this case as well, the advantages of the invention can be obtained by constructing so as not to execute the calculations in a predetermined state in each control.

Although the embodiments have been described with respect to the optical disc servo control apparatus, the idea of the present invention also can be similarly applied to the tracking and focus servo control apparatuses in the optical card.

What is claimed is:

1. An optical information recording and reproducing apparatus for effecting at least one of recording of information on and reproducing of information from a recording medium that includes a plurality of tracks, by use of a light beam, said apparatus comprising:

an optical system for applying the light beam to a desired track on the recording medium;

tracking error signal generating means for detecting a tracking error of the light beam relative to the track, and for outputting an analog tracking error signal indicative of the tracking error;

analog/digital conversion means for converting the outputted analog tracking error signal into a digital tracking error signal;

selection means for selecting a signal requiring computation processing, out of the digital tracking error signals output from said analog/digital conversion means;

digital computing means for effecting, on the basis of a predetermined program, a digital computation only for the digital tracking error signal selected by said selection means, to correct the detected tracking error, for calculating a tracking control movement amount for a tracking actuator, and for outputting a digital tracking control signal corresponding to the tracking control movement amount;

digital/analog conversion means for converting the digital tracking control signal into an analog tracking control signal; and a tracking actuator for receiving the analog tracking control signal, and for moving at least a portion of said optical system to move the light beam relative to the track.

2. An apparatus according to claim 1, wherein digital signals not selected by said selection means are sent to said digital/analog conversion means without passing through said digital computing means.

3. An apparatus according to claim 1, wherein said selecting means selects a signal having a value other than zero as the signal requiring the computation processing.

4. An optical information recording and reproducing apparatus for effecting at least one of recording of information on and reproducing of information from a recording medium that includes a plurality of tracks, by use of a light beam, said apparatus comprising:

an optical system for applying the light beam to a desired track on the recording medium;

focusing error signal generating means for detecting a focusing error of the light beam relative to the track, and for outputting an analog focusing error signal indicative of the focusing error;

analog/digital conversion means for converting the outputted analog focusing error signal into a digital focusing error signal;

selection means for selecting a signal requiring computation processing, out of the digital focusing error signals output from said analog/digital conversion means;

digital computing means for effecting, on the basis of a predetermined program, a digital computation only for the digital focusing error signal selected by said selection means, to correct the detected focusing error, for calculating a focusing control movement amount for a focusing actuator and for outputting a digital focusing control signal corresponding to the focusing control movement amount;

digital/analog conversion means for converting the digital focusing control signal into an analog focusing control signal; and a focusing actuator for receiving the analog focusing control signal, and for moving at least a portion of said optical system relative to the recording medium to adjust focus of the light beam on the recording medium.

5. An apparatus according to claim 4, wherein digital signals not selected by said selection means are sent to said digital/analog conversion means without passing through said digital computing means.

6. An apparatus according to claim 4, wherein said selection means selects a signal having a value other than zero as the signal requiring computation processing.

7. An optical information recording and reproducing method for effecting at least one of recording of information on and reproducing of information from a recording medium that includes a plurality of tracks, by use of a light beam, said method comprising the steps of:

applying the light beam to a desired track on the recording medium;

detecting a tracking error of the light beam relative to the track and outputting an analog signal indicative of tracking error;

converting the outputted analog tracking error signal into a digital tracking error signal;

selecting a signal requiring computation processing out of the digital tracking error signals converted in said converting step;

effecting computation processing, on the basis of a predetermined program, only for the digital tracking error signal selected in said selecting step, calculating a tracking control movement amount for a tracking actuator and outputting a digital tracking control signal corresponding to the tracking control movement amount to correct the tracking error;

converting the outputted digital tracking control signal into an analog tracking control signal; and moving the light beam relative to the track in accordance with the digital tracking control signal.

8. An optical information recording and reproducing method for effecting at least one of recording of information on and reproducing of information from a recording medium that includes a plurality of tracks, by use of a light beam, said method comprising the steps of:

applying the light beam to a desired track on the recording medium;

detecting a focusing error of the light beam relative to the track and outputting an analog signal indicative of focusing error;

converting the outputted analog focusing error signal into a digital focusing error signal;

selecting a signal requiring computation processing out of the digital focusing error signals converted in said converting step;

effecting computation processing, on the basis of a predetermined program, only for the digital focusing error signal selected in said selecting step, calculating a focusing control movement amount for a focusing actuator and outputting a digital focusing control signal corresponding to the focusing control movement amount to correct the focusing error;

converting the outputted digital focusing control signal into an analog focusing control signal; and moving the light beam relative to the recording medium in accordance with the digital focusing control signal to adjust focus of the light beam on the recording medium.

* * * * *

UNITED STATES PATENT AND TRADEMARK OFFICE
CERTIFICATE OF CORRECTION

PATENT NO.    : 5,448,542

DATED         : September 5, 1995

INVENTOR(S)   : Tuskasa Ogino

It is certified that error appears in the above-identified patent and that said Letters Patent is hereby corrected as shown below:

<u>COLUMN 1</u>:

Line 34, "in dependence" should read --depending--.

<u>COLUMN 2</u>:

Line 10, "valuables." should read --variables.--

Signed and Sealed this

Twenty-sixth Day of March, 1996

*Attest:*

BRUCE LEHMAN

*Attesting Officer*                *Commissioner of Patents and Trademarks*

UNITED STATES PATENT AND TRADEMARK OFFICE
CERTIFICATE OF CORRECTION

PATENT NO. : 5,448,542
DATED : September 5, 1995
INVENTOR(S) : Tsukasa Ogino

It is certified that error appears in the above-indentified patent and that said Letters Patent is hereby corrected as shown below:

On the Title Page, Item [56], under "FOREIGN PATENT DOCUMENTS":
The following should be inserted:
— 63-121136    5/1988    Japan —.

Column 2, line 10, "valuables." should read —variables.—

Signed and Sealed this

Twenty-eighth Day of May, 1996

Attest:

BRUCE LEHMAN

*Attesting Officer*    *Commissioner of Patents and Trademarks*